United States Patent
Aryanpanah et al.

(10) Patent No.: US 11,224,311 B2
(45) Date of Patent: Jan. 18, 2022

(54) GRINDER SAFETY CAP

(71) Applicants: David Aryanpanah, Beverly Hills, CA (US); Brian Anav, Beverly Hills, CA (US)

(72) Inventors: David Aryanpanah, Beverly Hills, CA (US); Brian Anav, Beverly Hills, CA (US)

(*) Notice: Subject to any disclaimer, the term of this patent is extended or adjusted under 35 U.S.C. 154(b) by 0 days.

(21) Appl. No.: 16/590,261

(22) Filed: Oct. 1, 2019

(65) Prior Publication Data

US 2021/0093124 A1   Apr. 1, 2021

(51) Int. Cl.
*A47J 42/34* (2006.01)
*A47J 42/56* (2006.01)
*A47J 42/14* (2006.01)
*A47J 42/50* (2006.01)

(52) U.S. Cl.
CPC .............. *A47J 42/34* (2013.01); *A47J 42/14* (2013.01); *A47J 42/50* (2013.01); *A47J 42/56* (2013.01)

(58) Field of Classification Search
CPC .. A47J 42/14; A47J 42/34; A47J 42/50; A47J 42/56; B65D 50/061
USPC ........................... 241/169.1, 273.3; 215/223
See application file for complete search history.

(56) References Cited

U.S. PATENT DOCUMENTS

| | | | |
|---|---|---|---|
| 3,445,022 A | 5/1969 | Cilluffo | |
| 3,604,585 A | 9/1971 | Towns | |
| 3,625,386 A | 12/1971 | Schaefer | |
| 3,907,103 A | 9/1975 | Shaw | |
| 4,022,352 A | 5/1977 | Pehr | |
| 4,053,077 A | 10/1977 | DeFelice | |
| 4,174,034 A | 11/1979 | Hoo | |
| 4,375,858 A | 3/1983 | Shah | |
| 4,387,817 A * | 6/1983 | Wiles | B65D 50/043 215/217 |
| 4,511,032 A | 4/1985 | Bush | |
| 5,292,017 A * | 3/1994 | Reiters | B65D 50/061 215/206 |
| 5,322,227 A * | 6/1994 | Fiocchi | A61J 7/0007 241/100 |
| 5,449,078 A | 9/1995 | Akers | |
| 5,752,615 A | 5/1998 | Hofmann | |
| 6,523,709 B2 | 2/2003 | Miceli | |
| 6,789,677 B2 | 9/2004 | Maietta | |
| 7,090,079 B2 | 8/2006 | Ehrlund | |

(Continued)

*Primary Examiner* — Jessica Cahill
*Assistant Examiner* — Jared O Brown

(57) ABSTRACT

The invention involves a grinder safety cap suitable for medicinal items such as herbs or other consumable substances that may be desirably restricted from children, and which may require grinding and/or homogenizing before ingestion. The grinder safety cap is comprised of a cover shell and base shell, wherein the cover shell fits snugly over an upwardly extending top wall of the base shell. The base shell may have upwardly extending grinding protrusions, having sharp and/or serrated edges, capable of grinding, cutting, or otherwise reducing the particle size of a consumable substance. The cover shell may also have downwardly extending grinding protrusions. A consumable substance may be placed within a cavity or receptacle of the base shell, the cover shell may be placed over the top wall of the base shell so as to close the grinder safety cap, and the consumable substance may be ground by turning the cover shell.

14 Claims, 7 Drawing Sheets

(56) References Cited

U.S. PATENT DOCUMENTS

| | | |
|---|---|---|
| 7,331,479 B2 | 2/2008 | Oh |
| 7,510,094 B1 | 3/2009 | Willis |
| 8,220,732 B2 | 7/2012 | Griffin |
| 8,393,563 B2 | 3/2013 | Chaoui |
| 8,424,695 B2 | 4/2013 | Buono |
| 8,695,906 B2 | 4/2014 | Hainbach |
| 9,505,009 B1 | 11/2016 | Wein |
| 9,521,929 B1 * | 12/2016 | Raphael ............... B02C 13/22 |
| 9,635,884 B2 | 5/2017 | Shalom |
| 9,757,733 B1 * | 9/2017 | Dukat ................. A47J 42/40 |
| 10,124,941 B2 | 11/2018 | Sibley |
| 2003/0121877 A1 | 7/2003 | Brozell et al. |
| 2005/0269280 A1 * | 12/2005 | Konefal ............... B65D 50/04 215/228 |
| 2014/0217213 A1 | 8/2014 | Edwards et al. |
| 2017/0368554 A1 | 12/2017 | Nichols |
| 2018/0332892 A1 | 11/2018 | Beaver |
| 2018/0338642 A1 | 11/2018 | Staiano |
| 2019/0125132 A1 | 5/2019 | Powers |
| 2019/0183179 A1 * | 6/2019 | Fortkort ............... A24F 47/008 |
| 2020/0260913 A1 * | 8/2020 | Sempere Ferri ....... A47G 19/24 |

* cited by examiner

GRINDER SAFETY CAP

TECHNICAL FIELD OF THE INVENTION

The present invention relates generally to a grinder safety cap, and more specifically, to a container cap or lid, wherein the user can place a consumable substance within a base of the cap and can turn a cover shell of the cap to grind the consumable substance.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Childproof receptacles or containers, such as childproof medicine bottles, containers, and boxes, have been in use for many years. In fact, the prior art is busy with different teachings for a wide variety of such safety containers. Recreational smoking containers, packages, displays, pipes and other apparatuses appear in many forms. Traditionally, a smoker may store and transport smoking herbs or consumable substances, such as loose tobacco, cannabis, or the like, in a container. Such a container may take the form of a simple plastic box with a lid, or may be a sealed plastic bag, or other such traditional storage mechanism. A smoker typically also needs to transport and store a smoking implement, such as a glass pipe in the form of a bowl or gravity pipe, rolling papers, or the like. A smoker would also need to transport and store an implement for igniting the smoking material, such as a traditional lighter, and any other desired implements for facilitating recreational smoking, such as a grinder, a clip, and any other such tool or implement.

With the widespread legalization of cannabis as a recreational and medicinal consumable substance, specialized containers are needed in order to facilitate and streamline the process for consuming such substances. Regarding smoking cannabis, tobacco, or other herbs, users often require many tools to prepare the consumable substance for ingestion. One can therefore appreciate the difficulty of storing and transporting numerous items in order to facilitate recreational smoking. It would therefore be advantageous to reduce the number of items needed to engage in recreational smoking, such as for example by creating a cap for a container of a consumable substance, wherein the cap also functions as a grinder to reduce the particle size of the consumable substance, in order to homogenize and prepare the substance and facilitate the consumption of the substance. Further, because certain consumables may be preferably sealed from children via safety means, it may be desirable to implement a safety means on said cap.

Therefore, there exists a previously unappreciated need for a new and improved combination grinder and safety cap that is easy to operate by all adults, including the elderly, but which is configured with a childproof safety mechanism so as to prevent access to children. Additionally, there exists a previously unappreciated need for a grinder safety cap mechanism which therefore reduces the number of items needed for a user to store, prepare and ingest a consumable substance.

It is to these ends that the present invention has been developed.

SUMMARY OF THE INVENTION

To minimize the limitations in the prior art, and to minimize other limitations that will be apparent upon reading and understanding the present specification, the present invention describes a childproof container cap or lid, which forms a receptacle for placing a consumable substance within a base shell of the cap, and wherein the user can turn a cover shell of the cap to grind the consumable substance.

Generally, the invention involves a grinder safety cap, which may attach to a container to form the lid of the container, which container may house a consumable substance, such as tobacco, cannabis, or other herb, recreational drug, or medicinal substance, and which substance may require grinding and/or homogenizing before ingestion. The grinder safety cap is comprised of a cover shell and a base shell, wherein the cover shell fits snugly over an upwardly extending inner edge of the base shell. The base shell may have upwardly extending grinding protrusions, having sharp and/or serrated edges, capable of grinding, cutting, or otherwise reducing the particle size of a consumable substance. The cover shell may also have downwardly extending grinding protrusions to facilitate the grinding mechanism. A consumable substance may be placed within a cavity or receptacle of the base shell, the cover shell may be placed over the inner edge of the base shell so as to close the grinder safety cap, and the consumable substance may then be ground by turning the cover shell.

A grinder safety cap in accordance with an exemplary embodiment of the present invention, comprises: a base shell including a top surface and a bottom surface encircled by a wall, wherein: an interior of the wall includes child-safety ridges that removably register the base shell directly to a child-safe container; and the top surface is devoid of openings and includes upwardly extending grinding protrusions; and a cover shell removably coupled to the base shell, the cover shell including an interior bottom surface with downwardly extending grinding protrusions, wherein the cover shell is configured to freely rotate about an axis on the top surface of the base shell.

A grinder safety cap in accordance with yet another exemplary embodiment of the present invention, comprises: a base shell including a top surface and a bottom surface encircled by a wall, wherein: an interior of the wall includes child-safety ridges that removably register the base shell directly to a child-safe container; the top surface is devoid of openings and includes upwardly extending grinding protrusions encircled by a top wall to define a receptacle on the top surface of the base shell; an exterior surface of the top wall includes a track spanning the circumference of the top wall; and a cover shell removably coupled to the base shell, the cover shell including an interior bottom surface with downwardly extending grinding protrusions, wherein the cover shell further comprises an indentation along an interior surface of the cover shell, wherein the track of the top wall of the base shell registers with the indentation of the cover shell; and wherein the upwardly extending grinding protrusions and the downwardly extending grinding protrusions are configured to grind a consumable substance placed within an interior cavity of the base shell.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

BRIEF DESCRIPTION OF THE DRAWINGS

Elements in the figures have not necessarily been drawn to scale in order to enhance their clarity and improve understanding of the various embodiments of the invention. Furthermore, elements that are known to be common and well understood to those in the industry are not depicted in order to provide a clear view of the various embodiments of the invention. The drawings that accompany the detailed description can be briefly described as follows.

DETAILED DESCRIPTION OF THE INVENTION

Figure 1:
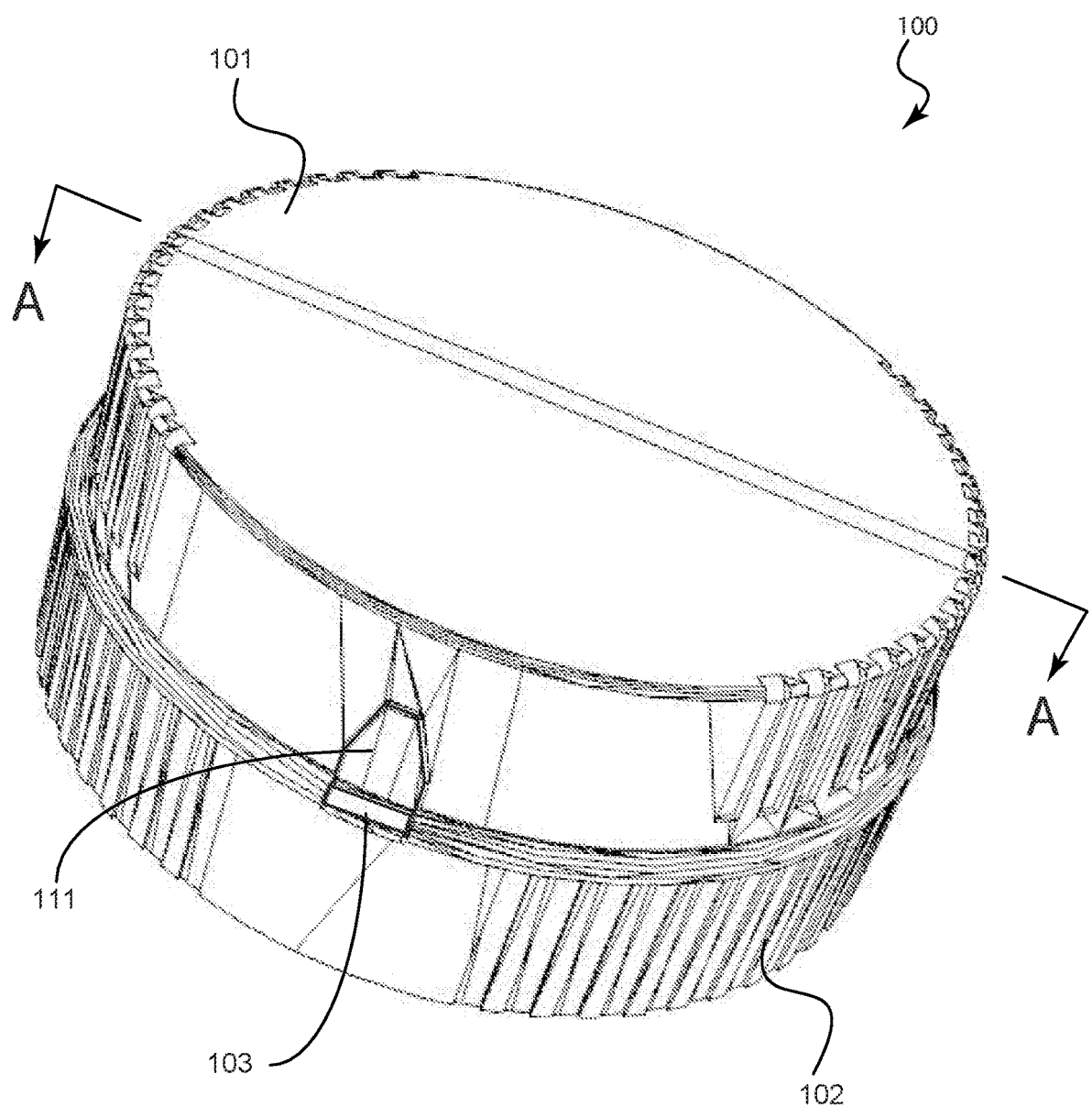
FIG. 1 illustrates a perspective view of the base and cover shells of the grinder safety cap, wherein the base and cover shells are in a closed position, in accordance with an exemplary embodiment of the present invention.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention. Wherever possible, the same reference numbers are used in the drawings and the following description to refer to the same or similar elements.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and or steps. Thus, such conditional language is not generally intended to imply that features, elements and or steps are in any way required for one or more embodiments, whether these features, elements and or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

The present invention provides a grinder safety cap, which forms a receptacle for placing a consumable substance within the cap and wherein turning a portion of the cap facilitates grinding of the consumable substance.

In exemplary embodiments, the grinder safety cap may be comprised of two portions or shells which fit snugly together. A base portion or base shell may attach to the top of a container to form the lid of the container. The base shell may have upwardly extending protrusions on a top surface, which protrusions may have sharp or serrated edges, capable of grinding, cutting, or otherwise reducing the consumable substance into smaller particles. A cover portion or shell may attach to and fit snugly over an upwardly extending inner edge of the base shell.

In some exemplary embodiments, the cover shell may be separated from the base shell only by a childproof safety mechanism, such as by use of registering tracks and protrusions within each shell, which protrusions and tracks are configured to engage with each other in a manner such that the cover shell may only be removed by the user pressing down on the cover shell, and simultaneously turning the cover shell, then lifting the cover shell. In exemplary embodiments, any childproof or safety mechanism for opening a container lid may be employed. Moreover, structural elements may additionally include locking ridges for preventing the grinder safety cap from being easily opened, as well as retention ridges that prevent the cover shell of the grinder safety from being taken apart or disengaged entirely from the base shell.

In some exemplary embodiments, the cover shell may be separated from the base shell merely by use of registering tracks and protrusions within each shell, and the more rigorous childproof safety mechanism is present instead at the bottom of the base shell so that the base shell forms a safety childproof cap for the container on top of which the grinder safety cap rests and secures.

In exemplary embodiments, the two shells of the grinder safety cap will form the lid and/or cap of a container. The container may store a consumable substance, such as tobacco, cannabis, or other herb, recreational drug, or medicinal substance. A user may employ use of the grinder safety cap by first removing the entire grinder safety cap from the container, wherein the grinder safety cap may also be removed from the container only by a childproof safety mechanism, such as by a safety mechanism requiring the user to hold the base shell of the grinder safety cap, press the base shell down onto the container, turn, and then lift the base shell to remove the entire grinder safety cap, thereby removing both base and cover shells of the grinder safety cap. In exemplary embodiments, any childproof or safety mechanism for opening a container lid may be employed to remove the grinder safety cap from the container.

The user can then remove a portion of the consumable substance from the container, and can place the consumable substance within the base shell of the grinder safety cap, place the cover shell over the base shell so as to close the base shell of the grinder safety cap, thereby fully enclosing the consumable substance within the base shell cavity or receptacle, and can then turn the cover shell in a clockwise rotation, counter-clockwise rotation, or both, wherein turning the cover shell serves to grind the consumable substance by engaging the consumable substance with the sharp protrusions of the base shell and/or the sharp protrusions of the cover shell.

Turning now to the figures, FIG. 1 illustrates a perspective view of a grinder safety cap 100, in accordance with an exemplary embodiment of the present invention, wherein grinder safety cap 100 comprises two shells—a cover shell 101 and a base shell 102—shown in this view in a closed position. As mentioned above, is exemplary embodiments, a grinder safety cap will be comprised of two portions or shells which fit snugly together; base shell 102 may attach to the top of a container (not shown) to form the lid of the container, which container may house a consumable substance, such as tobacco, cannabis, or other herb, recreational drug, or medicinal substance. The base shell 102 may attach to a container by a childproof safety mechanism, for example, wherein the base shell 102 can be removed from the container by gripping the base shell, pushing down, turning, and then lifting to remove. Any other known childproof safety mechanism for the opening of containers may be employed to achieve the same result. Moreover, structural elements may include locking ridges for preventing the grinder safety cap from being easily opened, as well as retention ridges that prevent the base shell 102 from being taken apart or disengaged entirely from the container.

Both cover shell 101 and base shell 102 may be comprised of a plastic, copolymer, or any other such material suitable for manufacturing such a medicinal container. In exemplary embodiments, each shell is spherical and/or cylindrical, as shown in the figures, although in other embodiments, any shape may be implemented without deviating from the scope of the present invention. A childproof grinder safety cap in accordance with the present invention may be constructed using one or several types of plastics or polymers. In exemplary embodiments however, plastic resins certified as USP Class VI may be utilized so that the grinder safety cap and its corresponding container (not shown) are suitable as a medicinal container—this may be useful for implementation with prescription or non-prescription medications, other medicinal items, edibles, or other such consumables that are desirably restricted from children.

In some exemplary embodiments, the grinder safety cap 100 may employ a childproof safety opening mechanism, such that cover shell 101 may only be removed from base 102 in a childproof manner. In some exemplary embodiments, this may be achieved by base shell 102 having a track and/or thread which corresponds with a track and/or thread within cover shell 101, which tracks or threads may be a thin, linear protrusion within the base shell, and a corresponding thin, linear indentation within the cover shell. The linear protrusion of the base shell 102 may fit inside of the linear indentation of the cover shell 101. In some exemplary embodiments, grinder safety cap 100 may be opened by the user simultaneously lifting and turning cover shell 101, wherein the cover 101 will be removed from base 102 when the track or thread of cover 101 meets a corresponding opening(s) 107 within the track or thread of base 102, which opening is made known to the user by marking 103. Alternatively, the tracks or threads may be composed in such a way that the user may have to simultaneously push down and turn the cover 101, before the cover 101 will be removed from the base 102. Any other known childproof safety mechanism for the opening of containers may be employed to achieve the same result. Moreover, structural elements may also include locking ridges for preventing the grinder safety cap from being easily opened, as well as retention ridges that prevent the cover shell 101 from being taken apart or disengaged entirely from the base shell 102.

Figure 2:
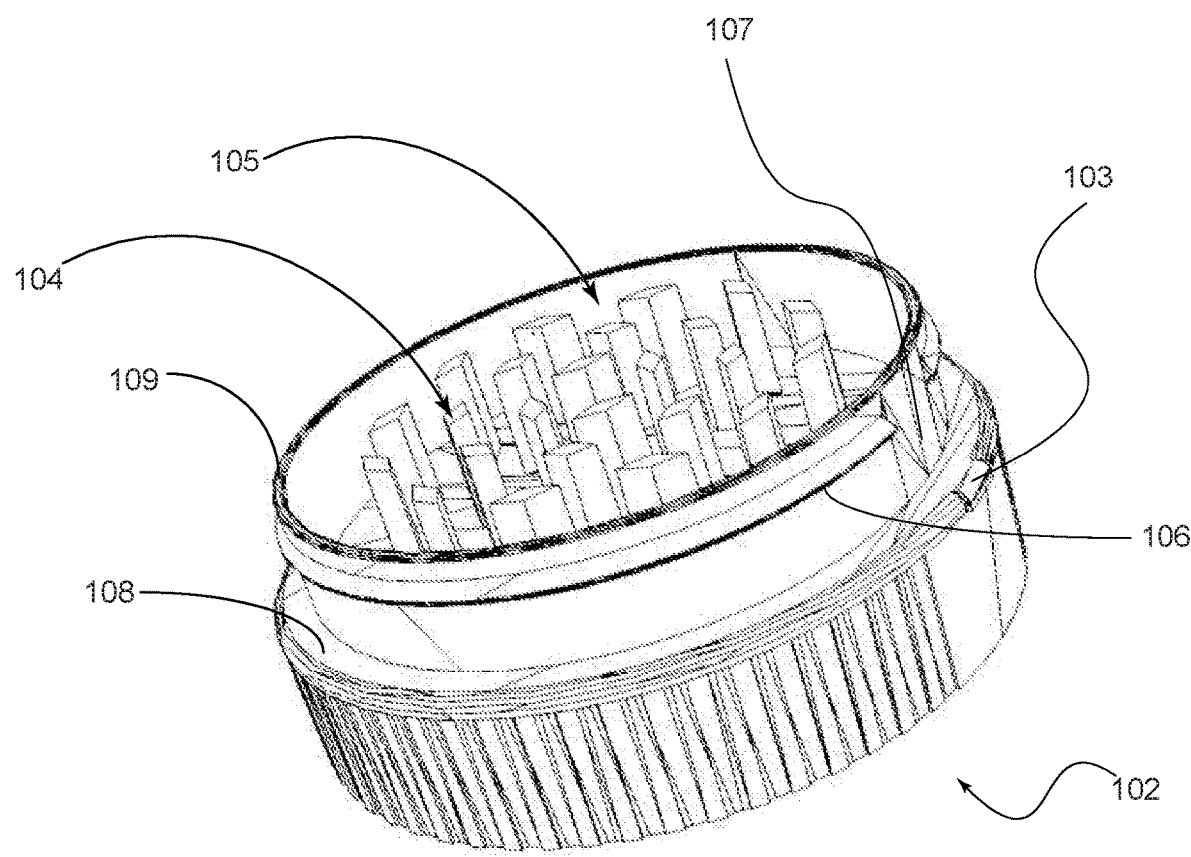
FIG. 2 illustrates a perspective view of the base shell of the grinder safety cap in accordance with an exemplary embodiment of the present invention.

Turning to FIG. 2, a perspective view of the base shell 102 of the grinder safety cap in accordance with an exemplary embodiment of the present invention is illustrated. The base shell 102 may have upwardly extending protrusions, such as protrusion 104, which protrusions may have sharp or serrated edges, capable of grinding, cutting, or otherwise reducing the consumable substance into smaller particles. A cover portion or shell 101 may attach to and fit snugly over the base shell 102. In exemplary embodiments, the cover shell 101 of the grinder safety cap will have complimentary protrusions, resembling protrusions 104 of base shell 102, so as to effectively grind the consumable substance.

As described above, base shell 102 may have a track(s) and/or thread(s) 106, which corresponds with a track(s)

and/or thread(s) within the cover shell 101, which tracks or threads 106 may be a thin, linear protrusion, or a thin, linear indentation, which tracks/threads may be disposed along a perimetric wall or circumferential wall that encloses the protrusion 104 protruding upwards from a top surface of the base shell 102. In exemplary embodiments, the grinder safety cap may be opened by the user simultaneously lifting and turning the cover shell 101, wherein the cover 101 will be removed from base 102 when the track or thread of the cover shell meets a corresponding opening(s) 107 within the track or thread 106 of base 102. A small, protruding ridge or marking 103 within the outer edge or wall encircling base shell 102 may denote the opening 107, to assist a user in visually determining the position at which the grinder safety cap may be opened. A similar protruding ridge or marking may also be created within the cover shell 101, which marking may correspond with the protruding ridge or marking 103 of base shell 102, so that when both markings (for example, marking 103 on base shell 102 and marking 111 on cover shell 101) are aligned, the grinder safety cap 100 can be opened.

The outer edge or wall encircling the base shell 102 may be gripped, pushed down, and simultaneously turned, so as to be removed from a container (not shown), to allow for retrieval of the consumable substance. Once the consumable substance or a portion thereof is removed from the container, the user may attach the base shell 102 to the container again, or may use the base shell 102 and its corresponding cover to grind the consumable substance without first reattaching base shell 102 to the container. The consumable substance may be placed within the cavity and/or receptacle 105 that surrounds the sharp grinding protrusions, such as grinding protrusion 104. To employ the grinder safety cap to grind the consumable substance, the user may place the cover shell 101 over the base shell 102 so as to close the base shell 102 cavity or receptacle 105, thereby fully enclosing the consumable substance within the base shell 102 cavity or receptacle 105, and the user can then turn the cover shell 101 in a clockwise rotation, counter-clockwise rotation, or both, wherein turning the cover shell 101 serves to grind the consumable substance by engaging the consumable substance with the sharp grinding protrusions, such as grinding protrusion 104, of the base shell 102 and/or the grinding protrusions of the cover shell 101. The cover shell 101 may also have similar grinding protrusions, so as to more effectively grind the consumable substance.

Figure 3:
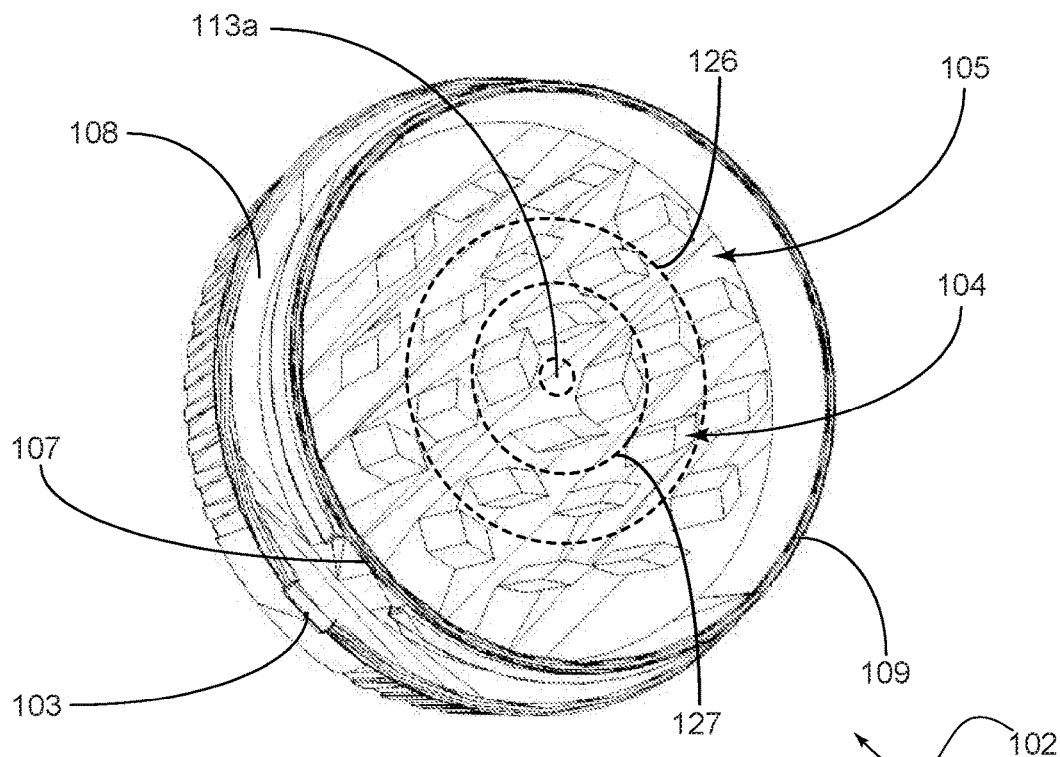
FIG. 3 illustrates another perspective view of the base shell of the grinder safety cap in accordance with an exemplary embodiment of the present invention.

Turning now to the next figure, FIG. 3 illustrates another perspective view of the base shell 102 of the grinder safety cap in accordance with an exemplary embodiment of the present invention. Base shell 102 may have upwardly extending grinding protrusions, such as protrusion 104, which protrusions may have sharp, serrated edges, capable of grinding, cutting, or otherwise reducing the consumable substance into smaller particles. Base shell 102 may have an outer edge 108, which may be greater in circumference than an upwardly extending inner edge or wall 109 that encircles or surrounds protrusions 104. The cover shell 101 of the grinder safety cap 100 may fit snugly over wall 109 and rest on the surface provided by outer edge 108 when the grinder safety cap 100 is in a closed position.

The wall 109 may include the track(s) and/or thread(s) 106 mentioned above, which may correspond with a track(s) and/or thread(s) within the cover shell, which tracks or threads may be thin, linear protrusions. In exemplary embodiments, the grinder safety cap 100 may be opened by the user simultaneously lifting and turning the cover shell 101, wherein the cover 101 will be removed from base 102 when the track or thread of the cover shell 101 meets a corresponding opening(s) 107 within the track or thread of base 102. A small, protruding ridge or marking 103 within the outer edge 108 of base shell 102 may denote the opening 107, to assist a user in visually determining the position at which the grinder safety cap may be opened. A similar protruding ridge or marking 111 may also be created within the cover shell 101, which marking may correspond with the protruding ridge or marking in the outer edge 108, so that when both markings are aligned, the grinder safety cap can be opened. In exemplary embodiments, the cover shell 101 and the base shell 102 include markings 107 and 111 that facilitate registering the cover shell 101 to the base shell 102, wherein the cover shell 101 can only be removed from the base shell 102 when the markings 107 and 111 on each respective shell are aligned.

Figure 4:
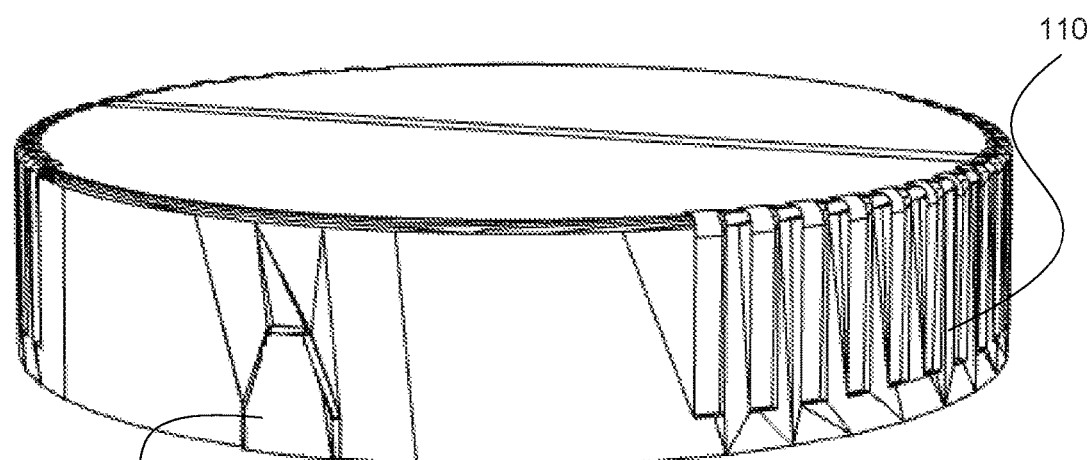
FIG. 4 illustrates a side perspective view of the cover shell of the grinder safety cap in accordance with an exemplary embodiment of the present invention.

Turning to FIG. 4, a side perspective view of the cover shell 101 of grinder safety cap 100 in accordance with an exemplary embodiment of the present invention is illustrated. In exemplary embodiments, the top exterior surface of the cover shell 101 may be flat and smooth without any protrusions or indentations. In exemplary embodiments, the smooth, flat top surface of the cover shell 101 may make the grinder safety cap (and its corresponding container) easy to hold and operate. Moreover, the flat smooth surface may make the device easy to store in a pocket, and easy for a distributer, such as a shop, pharmacy, or supplier to store in a large inventory form. As shown, the side edge of the cover shell 101, and the side edge of the base shell 102, may have indentations and grooves, such as 110, which serve to provide friction for a user to grip the edges while pushing and turning to separate the cover shell 101 from the base shell 102 and thereby open the grinder safety cap. In exemplary embodiments, the top exterior surface of the cover shell 101 may contain printed instructions, such that a user may read how to operate the grinder safety cap.

Cover shell 101 may have a marking 111, which marking may be a protrusion in the shape depicted (or having any other desired shape or appearance), which marking may correspond with marking 103 of base shell 102, wherein when both markings are aligned, the cover shell 101 can be removed from base shell 102, such that the grinder safety cap can be opened, employing a childproof mechanism.

Figure 5:
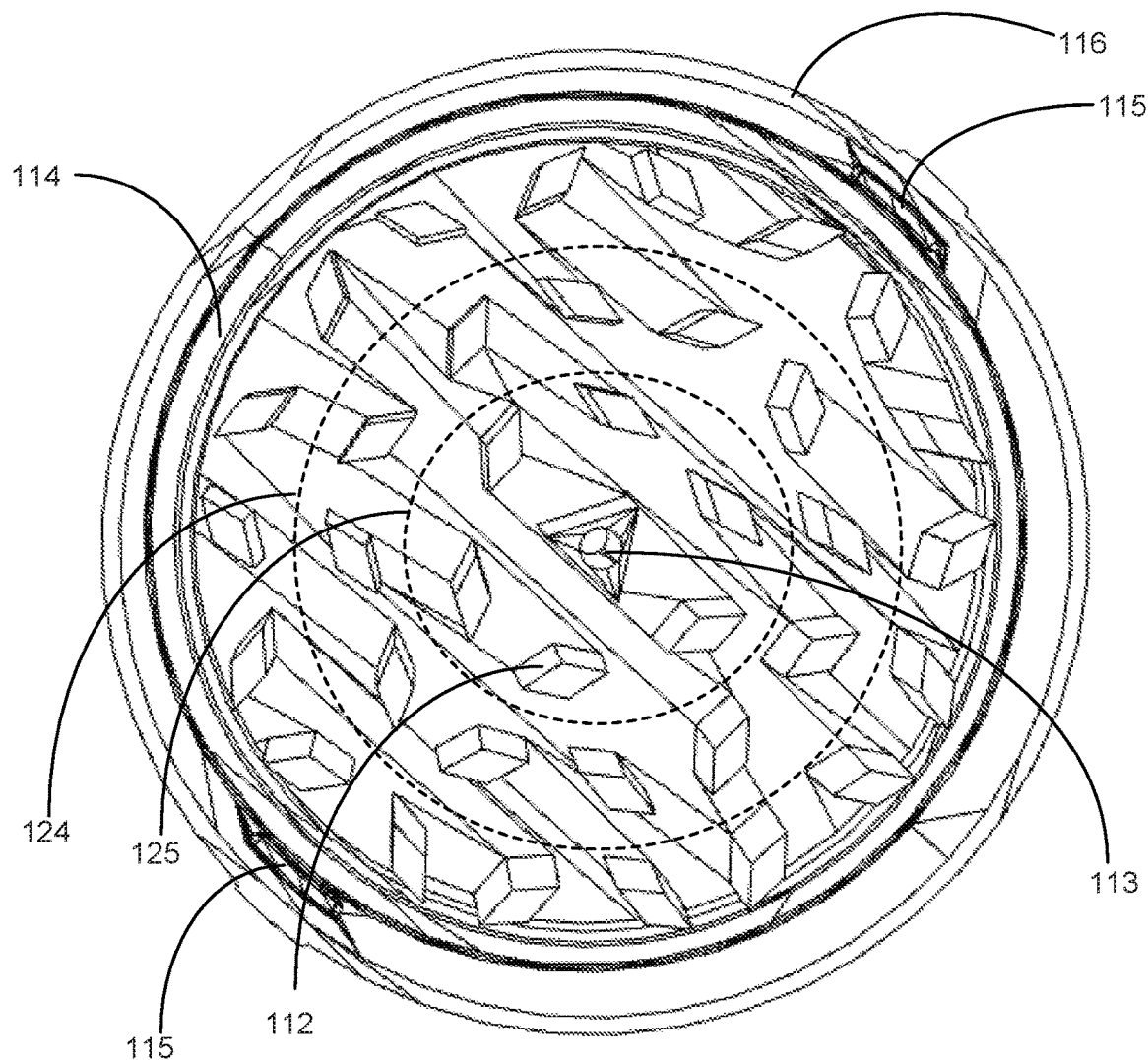
FIG. 5 illustrates a downward perspective view of the cover shell of the grinder safety cap in accordance with an exemplary embodiment of the present invention.

Turning to FIG. 5, a bottom view of the cover shell 101 of the grinder safety cap in accordance with an exemplary embodiment of the present invention is illustrated. The cover shell 101 may have downwardly extending grinding protrusions, such as protrusion 112, which protrusions may have sharp and/or serrated edges, capable of grinding, crushing, or otherwise reducing and homogenizing the particle size of the consumable substance. Cover shell 101 may have a center point 113, which may fit snugly within a center region 113a of base shell 102, and which allows the cover shell 101 to be smoothly and freely rotated about an axis of the base shell 102, wherein the downwardly extending protrusions of the cover shell 101, such as protrusion 112, do not meet and/or touch the upwardly extending protrusions of the base shell 102, such as protrusion 104, so that the free rotation mechanism of the grinder safety cap is not hindered. The free rotation mechanism is achieved due to the downwardly extending grinding protrusions on the interior bottom surface of the cover shell 101 forming a plurality of concentric circles, such as about circles 124 and 125, and the upwardly extending grinding protrusions on the top surface of the base shell 102 forming a complementary plurality of concentric circles adapted to register with the plurality of concentric circles formed by the downwardly extending grinding protrusions on the interior bottom surface of the cover shell 101.

The wall 116 of the cover shell 101 may fit snugly around an upwardly extending inner edge or wall 109 of the base shell 102 when the grinder safety cap is in a closed position. To employ the childproof safety mechanism for opening the grinder safety cap, cover shell 101 may include one or more horizontal, linear indentations 115 spanning a portion of the interior wall 116 of the cover shell 101, which indentation(s) 115 may register with protrusion 106 of the base shell 102, which protrusion 106 fits snugly against indentation 115. In this manner, the cover shell 101 may be removed from base shell 102 only when the linear indentation(s) 115, i.e. track or thread of cover 101, meets a corresponding opening(s) 107 within the protrusion 106, i.e. track or thread of base 102, which opening is made known to the user by marking 103. An inner edge, track, and/or thread(s) 114 may also be employed to provide an additional structural element, such as a locking ridge(s), for preventing the grinder safety cap from being easily opened, as well as a retention ridge(s) that prevent the cover shell 101 from being taken apart or disengaged entirely from the base shell 102.

Figure 6:
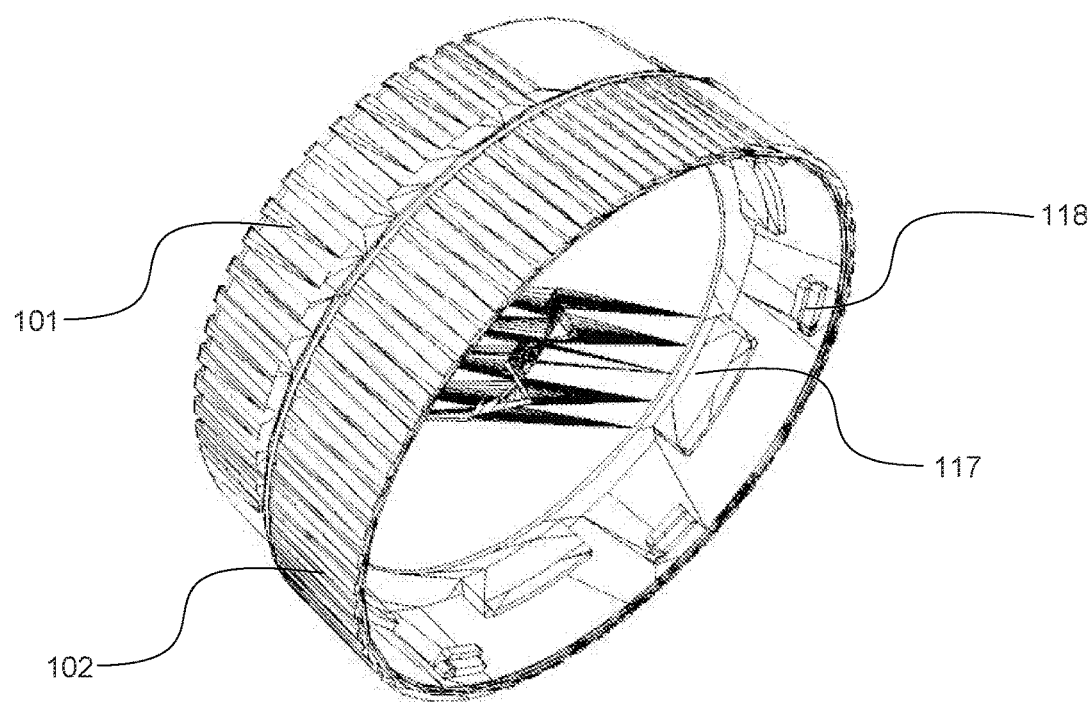
FIG. 6 illustrates a side perspective view of the base and cover shells of the grinder safety cap, wherein the base and cover shells are in a closed position, in accordance with an exemplary embodiment of the present invention.

Turning to FIG. 6, a side perspective view of grinder safety cap 100, wherein the base and cover shells 102 and 101 are in a closed position, in accordance with an exemplary embodiment of the present invention is illustrated. Cover shell 101 fits snugly over an upwardly extending inner edge (not shown) of base shell 102, when the grinder safety cap is in a closed position.

As may be appreciated from this view, the underside of base shell 102 may contain locking ridges, such as locking ridges 117 and 122, which may be in the shape of square, rectangular, or linear protrusions, which may correspond with openings of the same shape on an outer region of the mouth of a container (not shown), or which may correspond with tracks or threads within the mouth of a container, such that the locking ridges, e.g. 117 and 122, may attach to the top of the container, so that base shell 102 will forms a lid or cap over said container.

Figure 7:
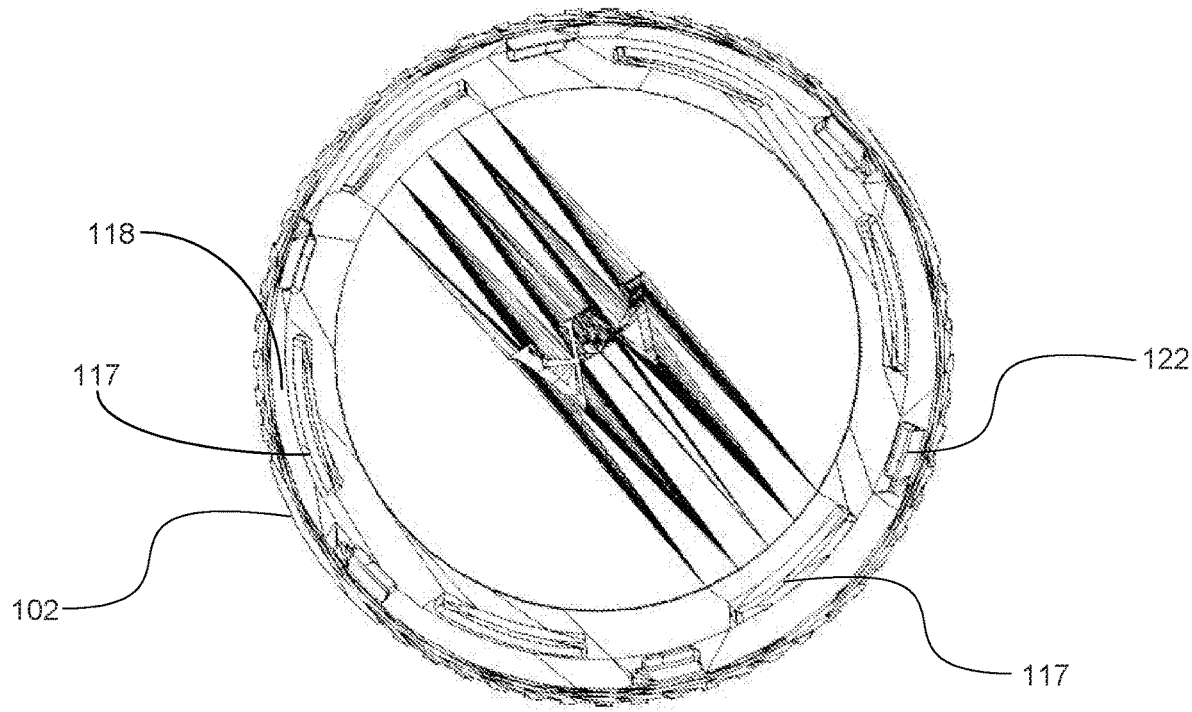
FIG. 7 illustrates a bottom perspective view of the base shell of the grinder safety cap, in accordance with an exemplary embodiment of the present invention.

FIG. 7 depicts a bottom view of the base shell 102 of the grinder safety cap, in accordance with an exemplary embodiment of the present invention. The underside of base shell 102 may contain locking ridges, such as 117 and 122, which may be in the shape of square, rectangular, or linear protrusions, which may correspond with openings of the same shape within the top of a container (not shown), or which may correspond with tracks or threads within the top of a container, such that the locking ridges, e.g. 117 and 122, may attach to the top of the container, so that base shell 102 will form a lid or cap over the container.

In this manner, the grinder safety cap 100 (or even just base shell 102) may form the lid or cap of a container; because base shell 102 includes locking ridges such as locking ridges 117 and 122, grinder safety cap 100 (or even just base shell 102) is effectively a childproof cap for the container. The underside of base shell 102 may additionally contain threads and/or tracks, which may correspond with threads and/or tracks of a container (not shown), such that the grinder safety cap will form a cap for the container, and can be removed entirely from the container in a traditional manner, and/or by a childproof safety mechanism.

As a person of ordinary skill in the art will appreciate, the locking ridges may be configured to match a wide variety of universal or custom made child proof containers, including but not limited to glass jars, plastic medicine bottles, long deep container or flatter shallow containers commonly used for consumables but which may include child safety or childproof mouth, or any other container suitable for storing consumables that may be preferably stored under secured conditions to prevent child access.

Figure 8:
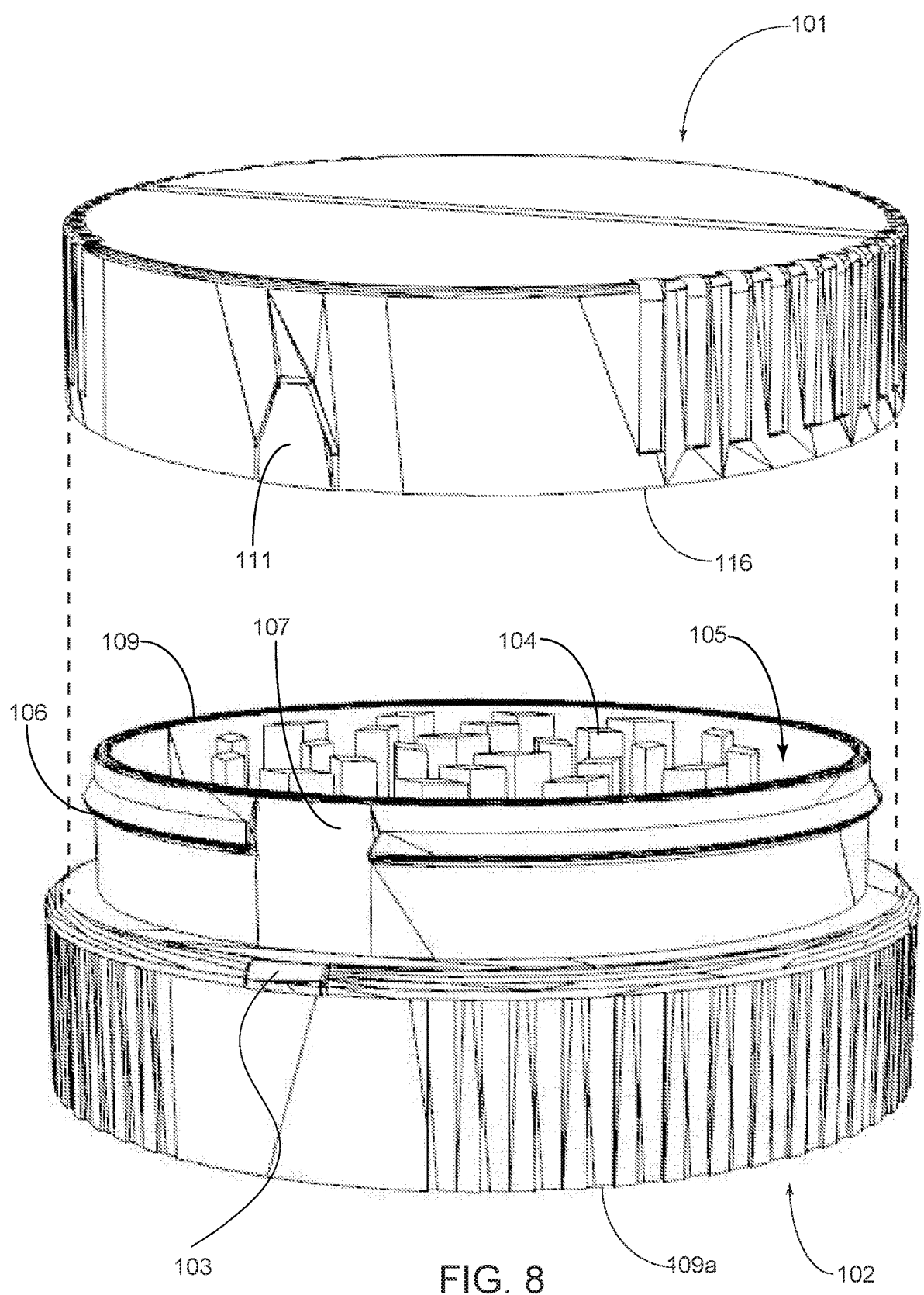
FIG. 8 illustrates an exploded view of the base shell and cover shell of the grinder safety cap in accordance with an exemplary embodiment of the present invention.

FIG. 8 illustrates an exploded view of the base shell 102 and cover shell 101 of the grinder safety cap in accordance with an exemplary embodiment of the present invention. In exemplary embodiments, the top exterior surface of the cover shell 101 may be flat and smooth without any protrusions or indentations. In exemplary embodiments, the smooth, flat top surface of the cover shell 101 may make the grinder safety cap (and its corresponding container) easy to hold and operate. Moreover, the flat smooth surface may make the device easy to store in a pocket, and easy for a distributer, such as a shop, pharmacy, or supplier to store in a large inventory form. As shown, the side edge of the cover shell 101, and the side edge of the base shell 102 may have indentations and grooves which serve to provide friction for a user to grip the edges while pushing and turning to separate the cover shell 101 from the base shell 102 and thereby open the grinder safety cap. In exemplary embodiments, the top exterior surface of the cover shell 101 may contain printed instructions, such that a user may read how to operate the grinder safety cap.

Base shell 102 may contain an upwardly extending wall 109, which may contain a horizontally protruding linear track and/or thread 106, which may correspond with a track, and/or thread, and or/groove or indentation 115 within the interior of the cover shell 101, such that the cover shell 101 may fit snugly over the upwardly extending wall 109 of base shell 501. In exemplary embodiments, the two shells can be separated only by a childproof safety mechanism. Such childproof safety mechanism may be achieved by requiring the user to turn the cover shell 101 around the wall 109, until the marking 111 is aligned with marking 103, wherein at marking 103, the thread and/or track 106 has an opening 107, which opening allows the cover shell 101 to be separated from the base shell 102, but wherein the cover shell 101 cannot be separated from the base shell 102 at any other position.

The base shell 102 may have upwardly extending grinding protrusions such as 104, which protrusions may have sharp and/or serrated edges, capable of grinding, crushing, or otherwise reducing and homogenizing the particle size of the consumable substance. In exemplary embodiments, the cover shell 101 may also have downwardly extending grinding protrusions. The consumable substance may be removed from the container, when the grinder safety cap has been removed from the container by a child safety mechanism, and the consumable substance can be placed within the interior cavity or receptacle 105 of the base shell 102. The user can then place the cover shell 101 over the wall 109 to close the grinder safety cap, and can turn the cover shell 101 clockwise and counter-clockwise to grind and homogenize the consumable substance.

In exemplary practice, operating grinder safety cap may be achieved by using both hands. For example, and without limiting the scope of the present invention, the user may use one hand to grip the container upon which the grinder safety cap is attached, and may use another hand to grip the base shell 102 of the grinder safety cap; the user can then follow the childproof safety mechanism implemented to open the container, such as for example, pressing the base shell 102 of the grinder safety cap downward, simultaneously turning the base shell 102 of the grinder safety cap, then lifting the base shell 102 at a designated position. In this manner, the user will have removed the grinder safety cap from the container, and can then remove a portion of a consumable substance from the container. In exemplary embodiments, any known childproof and/or safety mechanism for opening a container may be employed.

The portion of the consumable substance can be placed within the cavity 105 of the base shell 102 of the grinder safety cap. The user can then place the cover shell 101 over the wall 109 base shell 102, thereby closing the grinder safety cap. The user can then turn the cover shell 101 clockwise and counterclockwise around the upwardly extending wall 109 of the base shell, thereby grinding the consumable substance within the grinder safety cap. Finally, the user can then grip the base shell 102 with one hand, the user may grip the cover shell 101 with the user's other hand, and can simultaneously turn and lift the cover shell 101 until it can be removed once it reaches a designated position, i.e. where marking 111 meets marking 103, which markings denote opening 107. The consumable substance will then be ground into finer, homogenized particles and ready for consumption.

Figure 9:
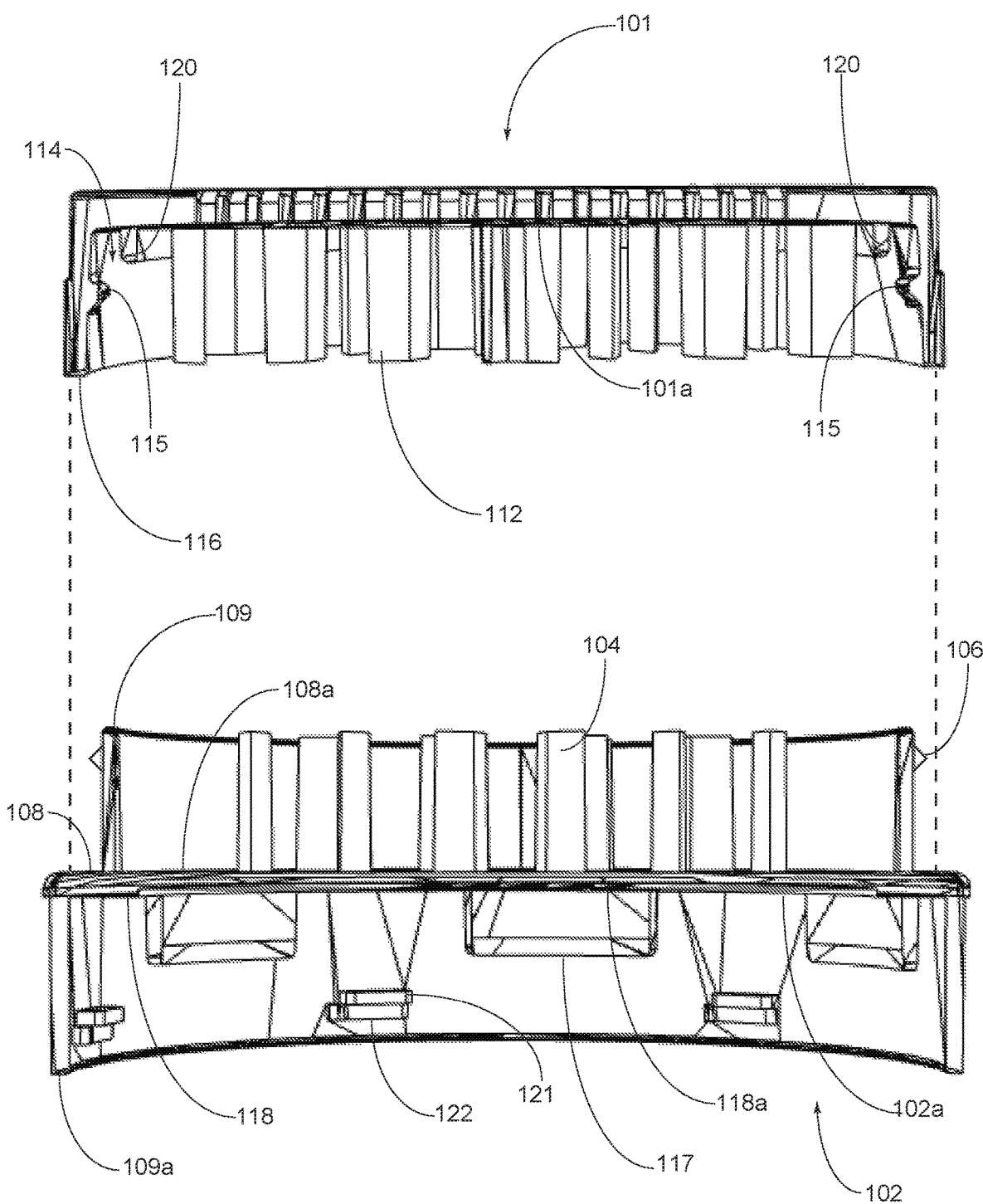
FIG. 9 illustrates an exploded cross-sectional view along line segment A of the base and cover shells of the grinder safety cap, in accordance with an exemplary embodiment of the present invention.

Turning to FIG. 9, an exploded cross-sectional view along line segment A-A (see FIG. 1) of the base and cover shells of the grinder safety cap, in accordance with an exemplary embodiment of the present invention is illustrated. Cover shell 101 is shown having downwardly extending grinding protrusions, such as grinding protrusion 112. From this view, it may be appreciated how track 114 for registering with wall 109 may be formed by having locking ridge 115 extend horizontally from the interior of the wall 116 of the cover shell 101, and by having locking ridge 120 extend downwardly from the interior of the top surface of the cover shell 101. Locking ridge 120 may span the entire circumference of the cover shell 101, or locking ridge 120 may be a smaller protrusion; additionally, where locking ridge 120 does not span the entire circumference of the cover shell 101, the cover shell 101 may employ numerous locking ridges 120. Locking ridges 115 and 120 may thereby form the space and/or indentation (track 114) for insertion of the protrusion 106.

Base shell 102 may have upwardly extending protrusions, such as protrusion 104. Base shell 102 may have an outer edge or wall 108, which is greater in width than an inner edge or wall 109. Wall 109 may fit snugly inside cover shell 101 when the grinder safety cap is in a closed position. As may be gleaned from this view, below protrusion 105 that extend from a top surface of base shell 102, is a smooth flat interior surface 102a of base shell 102 that is devoid of openings and has no other structures. This allows base shell 102 to effectively serve as a childproof cap for a container compatible with the threads or structures as will be described in turn.

Within the underside of base shell 102, and not on the bottom interior surface 102a of base shell 102, but along its bottom wall 109a, and more specifically along an interior region of bottom wall 109a, may be locking ridges 121 and 122 that protrude therefrom. In exemplary embodiments, such as shown, these may be paired steps formed from the wall of bottom wall 109a. In other embodiments, these locking ridges may be more or less and protrude at various sections of the interior bottom wall 109a, and may be in any quantity desired, wherein these locking ridges may attach to corresponding locking ridges within the top of a container (not shown) such that the base shell 102 cannot be removed from the container except by a childproof safety mechanism. Locking ridges 121 and 122 may be formed in the shape of square, rectangular, or linear horizontal protrusions from the side interior edge of the underside of the base shell 102. The locking ridges 121 and 122 may be misaligned in shape, and may correspond with similarly-shaped indentations within the top of a container (not shown), in order to create difficulty and require enhanced dexterity for the removal of base shell 102 from said container, thereby creating a childproof mechanism for the opening of the underlying container upon which the grinder safety cap 100 is attached.

From this view, a track 118 that is formed between the interior of bottom wall 109a and the plurality of locking ridges 117 can be appreciated; this track 118 is generally configured to receive a rim or top surface of the mouth of a container therein.

Figure 10:
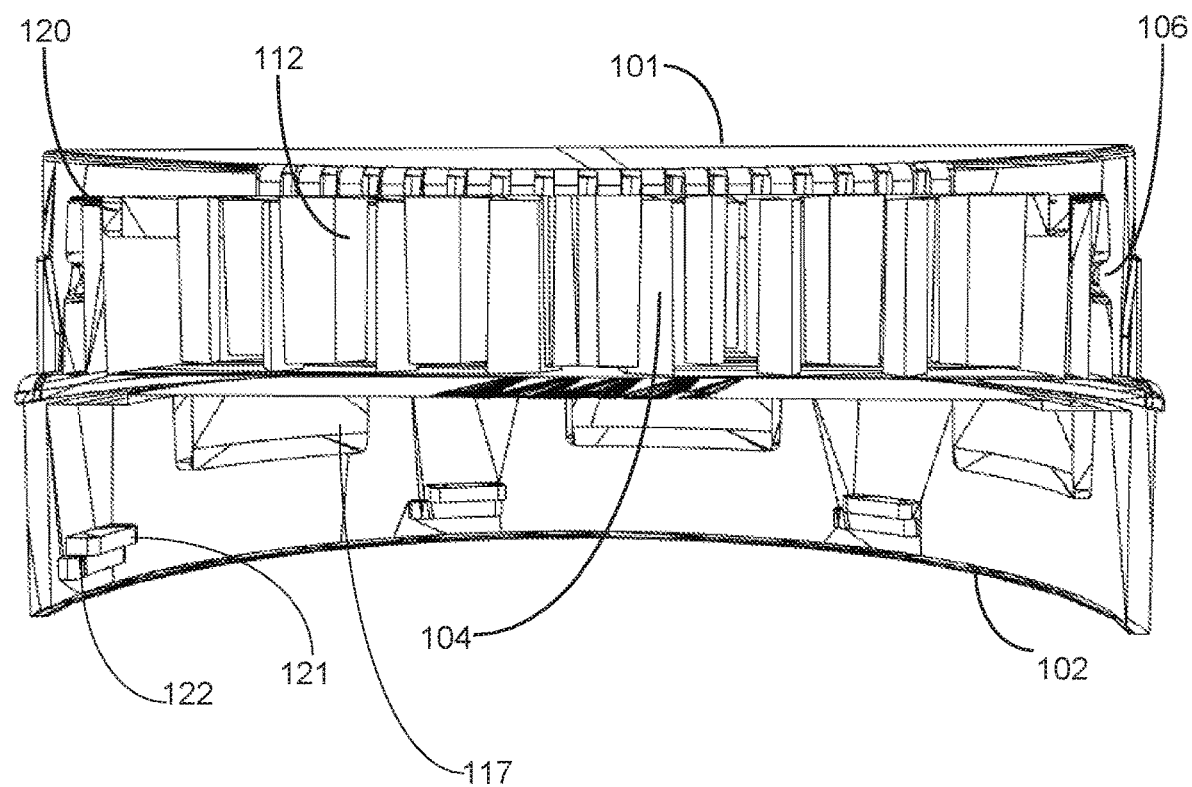
FIG. 10 illustrates a cross-sectional view along line segment A of the base and cover shells of the grinder safety cap, wherein the base and cover shells are in a closed position, in accordance with an exemplary embodiment of the present invention.

Finally turning to FIG. 10, a cross-sectional view along line segment A of the base and cover shells of the grinder safety cap, wherein the base and cover shells are in a closed position, in accordance with an exemplary embodiment of the present invention is illustrated. The upwardly extending wall 109 of base shell 102 fits snugly within cover shell 101 when the grinder safety cap is in a closed position. The linear protrusion forming track and/or thread 106 of base shell 102 fits within the indentation, groove, track and/or thread 115 of cover shell 101, when the grinder safety cap is in a closed position, such that the cover shell 101 cannot be removed from the base shell 102 without first aligning the cover shell 101 and base shell 102 to the designated position wherein track 106 has an opening. Locking ridge 120 and locking ridge 115 serve to keep cover shell 101 securely locked to base shell 102, until the cover shell 101 is turned to the designated opening position.

Accordingly, in some exemplary embodiments, grinder safety cap 100 includes a base shell 102 including a top surface 108a encircled by a wall 109 and a bottom surface 118a encircled by a wall 109a, wherein: an interior of the wall 109a includes child-safety or locking ridges 121, 122 and or 117 that removably register the base shell 102 directly to a child-safe container (not shown); and the top surface 108a is devoid of openings and includes upwardly extending grinding protrusions 104. Moreover, grinder safety cap 100 further includes a cover shell 101 removably coupled to the base shell 102, the cover shell 101 including an interior bottom surface 101a with downwardly extending grinding protrusions 112, wherein the cover shell 101 is configured to freely rotate about an axis on the top surface 108a (and more specifically on outer edge 108 of top surface 108a) of the base shell 102.

In exemplary embodiments, base shell 102 includes a top wall 109 encircling the upwardly extending grinding protrusions 104 to define a receptacle on the top surface of the base shell 102. In exemplary embodiments, the top wall 109 encircling the upwardly extending grinding protrusions 104 comprises a smaller circumference than a circumference of the base shell 102 so as to form outer edge 108. In exemplary embodiments, the top wall 109 encircling the upwardly extending grinding protrusions 104 also comprises a track 106 along an exterior surface of the top wall 109, wherein the track 106 along the exterior surface of the top wall 109 includes an opening 107 adapted to register with at least one track ridge 115 protruding from the interior side surface of wall 116 the cover shell 101.

In exemplary embodiments, cover shell 101 further includes a track 114 along the interior bottom surface 101a of the cover shell 101, wherein the track 114 is defined by a circular ridge 120 extending downwardly from the interior bottom surface 101a, the track 114 configured to receive a portion of the base shell 102, and more specifically a top region of wall 109.

In exemplary embodiments, the upwardly extending grinding protrusions 104 on the top surface of the base shell 102 form a plurality of concentric circles 124, 125 adapted to register with a complementary plurality of concentric circles 126, 127 formed by the downwardly extending grinding protrusions 114 on the interior bottom surface 101a of cover shell 101.

A grinder safety cap has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A grinder safety cap, comprising:
   a base shell including a top surface and a bottom surface encircled by a wall, wherein:
   an interior of the wall includes child-safety ridges that removably register the base shell directly to a child-safe container;
   the top surface is devoid of openings and includes upwardly extending grinding protrusions encircled by a top wall to define a receptacle on the top surface of the base shell;
   an exterior surface of the top wall includes a track running parallel to the top surface and spanning the circumference of the top wall; and
   the child-safety ridges comprise of paired misaligned protrusions that form paired steps extending inward from a bottom region of the interior of the wall, the paired steps including a first step extending inward a first distance and a second step extending inward a second distance, the first distance being less than the second distance, the first step coupled to an underside of the second step and adapted to enhance a required dexterity for the removal of the base shell from the child-safe container; and
   a cover shell removably coupled to the base shell, the cover shell including an interior bottom surface with downwardly extending grinding protrusions, wherein the cover shell further comprises an indentation along an interior surface of the cover shell, wherein the track of the top wall of the base shell registers with the indentation of the cover shell; wherein the upwardly extending grinding protrusions and the downwardly extending grinding protrusions are configured to grind a consumable substance placed within an interior cavity of the base shell; and wherein the cover shell is configured to freely rotate about an axis on the top surface of the base shell while a portion of the top wall of the base shell registers within a channel on the bottom surface of the cover shell, the channel defined by a ridge encircling the downwardly extending grinding protrusions.

2. The grinder safety cap of claim 1, wherein the top wall encircling the upwardly extending grinding protrusions comprises a smaller circumference than a circumference of the base shell.

3. The grinder safety cap of claim 1, wherein the track spanning the circumference of the top wall includes an opening adapted to register with at least one track ridge protruding from the interior surface of the cover shell.

4. The grinder safety cap of claim 1, wherein the downwardly extending grinding protrusions on the interior bottom surface of the cover shell form a plurality of concentric circles.

5. The grinder safety cap of claim 4, wherein the upwardly extending grinding protrusions on the top surface of the base shell form a complementary plurality of concentric circles adapted to register with the plurality of concentric circles formed by the downwardly extending grinding protrusions on the interior bottom surface.

6. The grinder safety cap of claim 1, wherein the cover shell and the base shell further include markings that facilitate registering the cover shell to the base shell, and wherein the cover shell can only be removed from the base shell when the markings on each respective shell are aligned.

7. The grinder safety cap of claim 1, wherein an exterior surface of the cover shell has indentations and grooves.

8. The grinder safety cap of claim 1, wherein grinding the consumable substance is by turning the cover shell clockwise and counter-clockwise around the top wall of the base shell.

9. The grinder safety cap of claim 1, wherein an exterior of the bottom surface of the base shell has indentations and grooves.

10. The grinder safety cap of claim 1, wherein the cover shell and the base shell further include markings that facilitate registering the cover shell to the base shell, and wherein the cover shell can only be removed from the base shell when the markings on each respective shell are aligned.

11. The grinder safety cap of claim 1, wherein the top wall encircling the upwardly extending grinding protrusions comprises a smaller circumference than a circumference of the base shell.

12. A grinder safety cap, comprising:
    a base shell including a top surface and a bottom surface encircled by a wall, wherein:
    an interior of the wall includes child-safety ridges that removably register the base shell directly to a child-safe container;
    the top surface is devoid of openings and includes upwardly extending grinding protrusions encircled by a top wall that defines a receptacle on the top surface, an exterior of the top wall including a track defined by a linear protrusion parallel to the top surface with at least one opening disrupting the track;
    the child-safety ridges comprise of paired misaligned protrusions that form paired steps extending inward from a bottom region of the interior of the wall, the paired steps including a first step extending inward a first distance and a second step extending inward a second distance, the first distance being less than the second distance, the first step coupled to an underside of the second step and adapted to enhance a required dexterity for the removal of the base shell from the child-safe container; and
    a cover shell removably coupled to the base shell, the cover shell including an interior bottom surface with downwardly extending grinding protrusions, wherein:
    at least one ridge protruding from an interior wall of the cover shell registers with the at least one opening disrupting the track on the top wall of the base shell for the removal of the cover shell from the base shell; and
    the cover shell is configured to freely rotate about an axis on the top surface of the base shell while a portion of the top wall of the base shell registers within a channel on the bottom surface of the cover shell, the channel defined by a ridge encircling the downwardly extending grinding protrusions.

13. The grinder safety cap of claim 12, wherein the downwardly extending grinding protrusions on the interior bottom surface of the cover shell form a plurality of concentric circles.

14. The grinder safety cap of claim 13, wherein the upwardly extending grinding protrusions on the top surface of the base shell form a complementary plurality of concentric circles adapted to register with the plurality of concentric circles formed by the downwardly extending grinding protrusions on the interior bottom surface.

* * * * *